Feb. 5, 1957 P. A. KOERNER 2,780,475
MOBILE FRAME FOR LIFTING AND CARRYING FARM IMPLEMENTS
Filed July 15, 1955 2 Sheets-Sheet 2
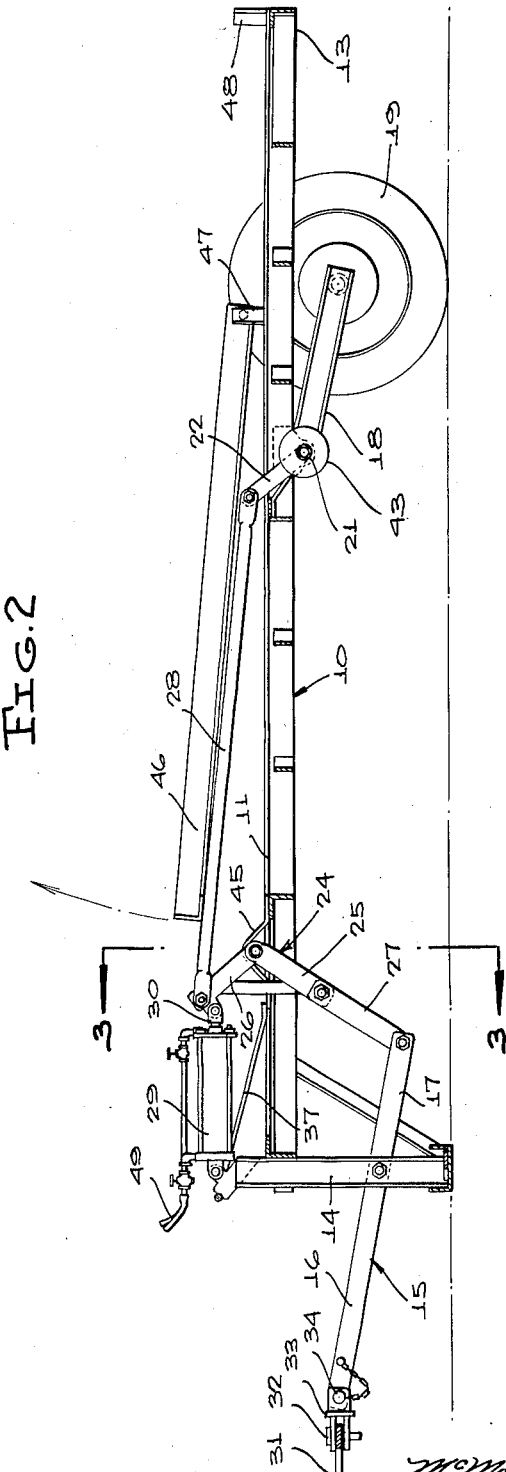
INVENTOR.
PHILIP A. KOERNER
BY
McMorrow, Berman + Davidson
ATTORNEYS

# United States Patent Office 2,780,475
Patented Feb. 5, 1957

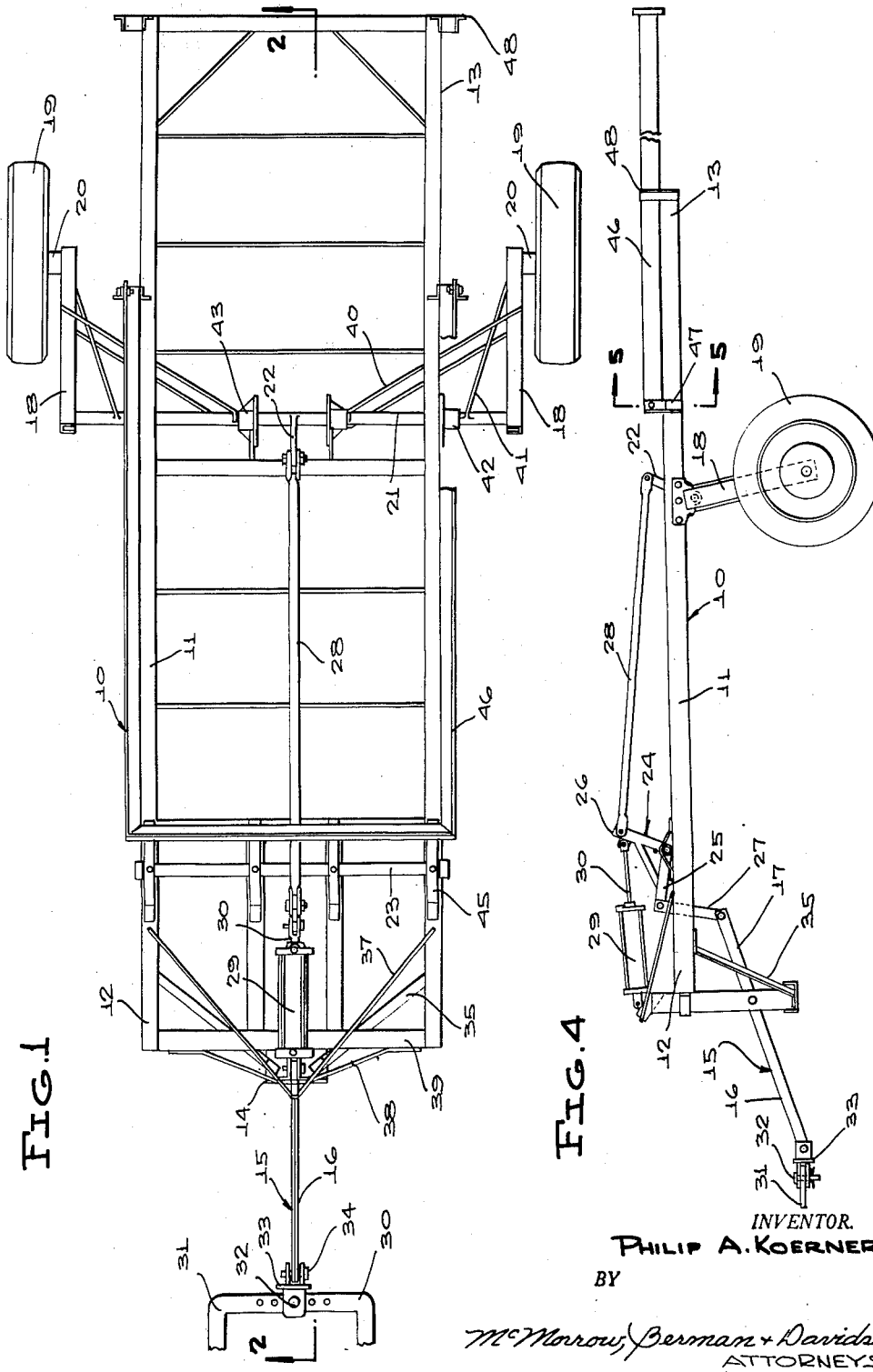

2,780,475
MOBILE FRAME FOR LIFTING AND CARRYING FARM IMPLEMENTS

Philip A. Koerner, Chatsworth, Ill.

Application July 15, 1955, Serial No. 522,192

3 Claims. (Cl. 280—44)

The present invention relates to a carrier for farm implements.

An object of the present invention is to provide a carrier for lifting and carrying farm implements and chattels such as rotary hoes, disk harrows, harrows, wagon jacks, feed bunks, stock watering tanks, and other bulky non-wheeled articles, such articles being secured to the carrier by chains, cables, or ropes so that such articles may be transported at a relatively high rate of speed over roads without damage to either the roads or to the articles.

Another object of the present invention is to provide a carrier for lifting and carrying farm implements of such size and width as to straddle relatively wide and long farm implements.

A further object of the present invention is to provide a carrier for lifting and carrying farm implements which uses the hydraulic system of a tractor for its lifting power.

A still further object of the present invention is to provide a carrier for lifting and carrying farm implements which is sturdy in construction and constructed of a few parts economical to manufacture and assemble.

These and other objects and advantages of the present invention will be readily understood from the following description when taken in connection with the annexed drawings, in which:

Figure 1 is a top plan view of the farm implement carrier of the present invention;

Figure 2 is a sectional view on the line 2—2 of Figure 1 showing the frame in lowered position;

Figure 3 is a sectional view, somewhat reduced, taken on the line 3—3 of Figure 2, greatly enlarged;

Figure 4 is a side elevational view showing the frame in raised position; and

Figure 5 is a detailed sectional view greatly enlarged taken on the line 5—5 of Figure 4.

Referring in greater detail to the drawings in which like numerals indicate like parts throughout the several views, the farm implement carrier of the present invention, indicated generally by the reference numeral 10, comprises a horizontally-disposed frame 11 having a forward end 12 and a rearward end 13. An upstanding leg 14 is dependingly and fixedly secured to the forward end 12 of the frame 11.

A beam 15 is arranged longitudinally of the frame 11 so that a part 16 is forwardly of the leg 14 and the remaining part 17 is rearwardly of the leg 14. The beam 15 is pivotally connected intermediate its ends to the leg 14 intermediate the upper and lower ends of the latter for pivotal up and down movements about a horizontal axis.

An arm 18 is arranged in an upright direction and is positioned on each side of the frame 11 adjacent the rearward end 13 of the frame 11 and a rotatable wheel 19 is positioned adjacent the lower end of each of the arms 18, each wheel having a horizontally disposed axle projecting outwardly therefrom supporting the lower end of the adjacent arm 18 for pivotal up and down movement of the arm 18 about the axle 20 as an axis. A crossbar 21 is carried on the frame 11 intermediate the forward end 12 and the rearward end 13 and connects the upper ends of the arms 18 together.

Means is provided for operatively connecting the end of the part 17 of the beam 15 which is rearwardly of the leg 14 to the intermediate portion of the crossbar 21 for effecting the up and down movements of the beam responsive to the up and down movements of the arms 18. Specifically, this means consists in an upright arm 22 having its lower end fixedly secured to the crossbar 21 intermediate the ends of the latter, a second crossbar 23 carried on the frame 11 spaced from the forward end 12 thereof, an L-shaped member 24 having its legs 25 and 26 arranged in vertical spaced relation projecting forwardly, the L-shaped member being fixedly secured at the point of connection of its legs together to the second crossbar 23 intermediate the ends of the latter, and a leg 27 having one end pivotally connected to the free end of the leg 25 which is the lowermost one of the legs 25 and 26 of the member 24, the other end of the leg 27 being pivotally connected to the end of the part 17 of the beam 15 which is rearwardly of the leg 14. The means also includes a bar 28 arranged longitudinally of the frame 11 and having one end pivotally connected to the uppermost leg 26 of the member 24 and its other end pivotally connected to the upper end of the upright arm 22 which is connected to the crossbar 21. Means is provided for effecting the up and down movements of the arms 18 to raise and lower the frame 11 relative to the wheels 19 and the ground and consists in a hydraulic cylinder assembly 29 operatively connected to the bar 28 and to the frame 11, the operating arm or rod 30 of the hydraulic cylinder assembly 29 being shown in Figure 2 in retracted position, in which position the frame is in its lowered position and in Figure 4 the rod 30 is shown in its extended position in which the frame is in its raised position.

Hitch means is provided on the end of the part 16 of the beam 15 which is forwardly of the leg 14 for pivotally attaching the beam 14 to the drawbar 31 of a towing vehicle, the vehicle not being shown. The drawbar is provided with a series of holes receiving a pin 32 which projects through a pair of plates constituting one-half of the hitch 33 arranged in horizontal spaced relation, the other half of the hitch 33 being another pair of plates arranged in vertical spaced relation and having a pin 34 extending therethrough and through a hole provided in the end of the beam 15.

Braces 35 extend from the outside edges of the frame 11 to a foot plate 36 fixedly secured to the lower end of the leg 14 on each side of the leg 14. Other braces 37 extend from the sides of the frame 11 to the upper end of the leg 14 and a strap 38 extends around the front of the leg 14 and is connected to the front crosspiece 39 of the frame.

Other braces 40 and 41 extend from each of the arms 18 to an intermediate portion of the crossbar 21 and are welded thereto. Bearings 42 support the crossbar 21 on the underside of the frame 11 on each side of the frame 11 and other bearings 43 carried by the frame 11 intermediate the sides thereof also support the crossbar 21. The crossbar 23 which is adjacent the forward end 12 of the frame 11 is secured to the frame 11 by means of other bearings 44 held down by straps 45, the bearings being shown most clearly in Figure 3.

An extension is provided for the frame 11 and is indicated in Figures 1 and 2 by the reference numeral 46, it being in the shape of a horizontally disposed U-shaped member formed from angle iron and having the free ends of each of its legs pivotally connected to brackets 47 secured to the side members of the frame 11 for swinging movement upwardly as indicated by the arrow in Figure 2 to an extended position shown in Figure 4. Other brackets 48 on each side of the rearward end of the frame 11 are saddle-shaped and receive the side portions of the extension 46 when it is in the extended position shown in Figure 4.

In use, fluid is supplied through conduits 49 to the hydraulic cylinder assembly 29 to effect the movements of the arms 18 supporting the wheels 19 and simultaneous swinging movement of the beam 15 when the end of the part 16 of the beam is secured to a towing vehicle, the swinging movement of the arms 18 being such as to raise the frame 11 lifting with it any farm implement carried beneath the frame 11. It is to be noted that the wheels 19 are spaced apart from each other so as to straddle any farm implement that is desired to lift and carry under or upon the frame 11, the extension 46 permitting the lifting of a farm implement rearwardly of the wheels 19 should the farm implement be too large to straddle between the wheels 19 or to be carried by the portion of the frame 11 forwardly of the wheels 19.

What is claimed is:

1. An implement carrier comprising a horizontally-disposed frame having a forward end and a rearward end, an upstanding leg dependingly and fixedly secured to the forward end of said frame, a beam arranged longitudinally of said frame so that a part is forwardly of said leg and the remaining part is rearwardly of said leg, said beam being connected intermediate its ends to said leg intermediate the upper and lower ends of the latter for pivotal up and down movements about a horizontal axis, means on the end of the part of said beam forwardly of the said leg for pivotally attaching said beam to a towing vehicle, an arm arranged in an upright direction positioned on each side of said frame adjacent the rearward end of said frame, a rotatable wheel positioned adjacent the lower end of each of said arms, each wheel having a horizontally-disposed axle projecting therefrom supporting the lower end of the adjacent arm for pivotal up and down movement of said arm about said axle as an axis, a crossbar carried on said frame connecting the upper ends of said arms together, and means operatively connecting the upper end of the part of said beam rearwardly of said leg to the intermediate portion of said crossbar for effecting the up and down movements of said beam responsive to the up and down movements of said arms.

2. An implement carrier comprising a horizontally-disposed frame having a forward end and a rearward end, an upstanding leg dependingly and fixedly secured to the forward end of said frame, a beam arranged longitudinally of said frame so that a part is forwardly of said leg and the remaining part is rearwardly of said leg, said beam being connected intermediate its ends to said leg intermediate the upper and lower ends of the latter for pivotal up and down movements about a horizontal axis, means on the end of the part of said beam forwardly of the said leg for pivotally attaching said beam to a towing vehicle, an arm arranged in an upright direction positioned on each side of said frame adjacent the rearward end of said frame, a rotatable wheel positioned adjacent the lower end of each of said arms, each wheel having a horizontally-disposed axle projecting therefrom supporting the lower end of the adjacent arm for pivotal up and down movement of said arm about said axle as an axis, a crossbar carried on said frame connecting the upper ends of said arms together, means operatively connecting the upper end of the part of said beam rearwardly of said leg to the intermediate portion of said crossbar for effecting the up and down movements of said beam responsive to the up and down movements of said arms, and means operatively connected to said arms for effecting the up and down movements of the latter.

3. An implement carrier comprising a horizontally-disposed frame having a forward end and a rearward end, an upstanding leg dependingly and fixedly secured to the forward end of said frame, a beam arranged longitudinally of said frame so that a part is forwardly of said leg and the remaining part is rearwardly of said leg, said beam being connected intermediate its ends to said leg intermediate the upper and lower ends of the latter for pivotal up and down movements about a horizontal axis, means on the end of the part of said beam forwardly of said leg for pivotally attaching said beam to a towing vehicle, an arm arranged in an upright direction positioned on each side of said frame adjacent the rearward end of said frame, a rotatable wheel positioned adjacent the lower end of each of said arms, each wheel having a horizontally-disposed axle projecting therefrom supporting the lower end of the adjacent arm for pivotal up and down movement of said arm about said axle as an axis, a crossbar carried on said frame intermediate said forward and rearward ends of the latter connecting the upper ends of said arms together, an upright arm having its lower end fixedly secured to said crossbar intermediate the ends of the latter, a second crossbar carried on said frame spaced from the forward end thereof, an L-shaped member having its legs arranged in vertical spaced relation projecting forwardly and being fixedly secured at the point of connection of its legs together to said second crossbar intermediate the ends of the latter, a link having one end pivotally connected to the free end of the lowermost one of the legs of said member and having its other end pivotally connected to the end of the part of said beam rearwardly of said leg, and a bar arranged longitudinally of said frame having one end pivotally connected to the uppermost one of the legs of said member and its other end pivotally connected to the upper end of the upright arm secured to said first end crossbar for effecting the up and down movements of said beam responsive to the up and down movements of said first-named arms, and means operatively connected to said bar for effecting the up and down movements of said first-named arms.

References Cited in the file of this patent

UNITED STATES PATENTS

| | | |
|---|---|---|
| 2,320,742 | Newkirk | June 1, 1943 |
| 2,664,039 | Heckathorn | Dec. 29, 1953 |
| 2,684,021 | Ratzlaff | July 20, 1954 |